(12) United States Patent  
Chin

(10) Patent No.: US 7,299,141 B2  
(45) Date of Patent: Nov. 20, 2007

(54) SYSTEM AND METHOD FOR CONTROLLING VIBRATION

(75) Inventor: Raymond Chin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 606 days.

(21) Appl. No.: 10/310,633

(22) Filed: Dec. 5, 2002

(65) Prior Publication Data

US 2004/0111225 A1 Jun. 10, 2004

(51) Int. Cl.
*G06F 19/00* (2006.01)

(52) U.S. Cl. ....................................................... 702/56

(58) Field of Classification Search .................. 702/56, 702/182–185, 54, 81, 82, 84; 369/47.44, 369/53.18, 53.42
See application file for complete search history.

(56) References Cited

U.S. PATENT DOCUMENTS

| | | | |
|---|---|---|---|
| 5,383,133 A * | 1/1995 | Staple | 700/280 |
| 5,636,193 A | 6/1997 | Ohmi | |
| 5,654,840 A | 8/1997 | Patton et al. | |
| 5,744,723 A * | 4/1998 | Piety | 73/660 |
| 5,777,815 A | 7/1998 | Kasiraj et al. | |
| 5,936,787 A | 8/1999 | Ohmi | |
| 5,963,517 A | 10/1999 | Nakagaki et al. | |
| 6,111,826 A | 8/2000 | Minase | |
| 6,226,140 B1 | 5/2001 | Serrano et al. | |
| 6,265,982 B1 * | 7/2001 | Ostwald | 340/683 |
| 6,314,077 B1 * | 11/2001 | Shishido et al. | 720/702 |
| 6,631,105 B1 * | 10/2003 | Fukuda et al. | 369/47.44 |
| 2001/0048370 A1 * | 12/2001 | Ostwald | 340/683 |
| 2004/0111737 A1 * | 6/2004 | Masaki et al. | 720/715 |

FOREIGN PATENT DOCUMENTS

| | | | |
|---|---|---|---|
| JP | 11-066717 | * | 3/1999 |
| JP | 2005-050448 | * | 2/2005 |

OTHER PUBLICATIONS

Webster's Ninth New Collegiate Dictionary, 1986, Merriam-Webster Inc., p. 666.*

* cited by examiner

*Primary Examiner*—Michael Nghiem

(57) ABSTRACT

Disclosed are systems and methods for reducing vibration in a device mounting structure, the method including determining when the vibration level of the device mounting structure exceeds a first threshold, and reducing the data transfer rate of at least one data transfer device mounted to the device mounting structure an amount sufficient to reduce the vibration to a level below a second threshold.

12 Claims, 3 Drawing Sheets

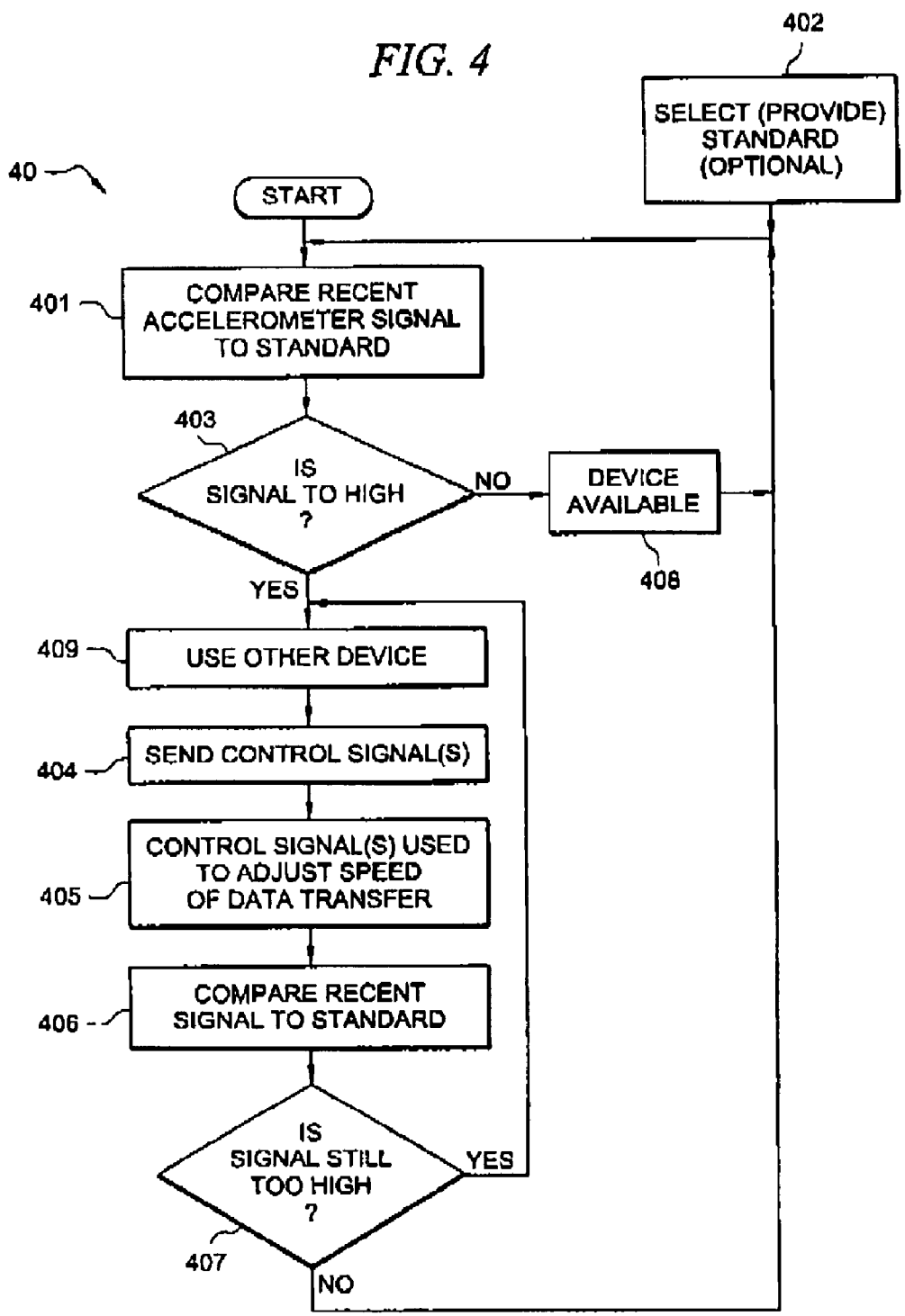

SYSTEM AND METHOD FOR CONTROLLING VIBRATION

BACKGROUND

In some situations, vibration of a housing or other mounting structure can cause one or more of the devices within that housing or otherwise attached to such a mounting structure to malfunction. For example, one piece of equipment may function perfectly well in one environment, but when that same piece of equipment is placed in proximity to other equipment, the vibrations from that other equipment may, when combined with vibration generated internal to the equipment in question, cause the equipment in question to malfunction.

In some situations, the operation of the equipment itself may, under some circumstances, be enough to cause malfunctioning of the equipment. This is particularly true as the data transfer rates of equipment continues to increase. This increase in data transfer rates translates, in some situations, to increased vibrations, which, in turn, may cause malfunctions to occur.

SUMMARY

In one embodiment, vibration reduction in a device mounting structure is achieved by determining when the vibration level of the device mounting structure exceeds a first threshold, and reducing the data transfer rate of at least one data transfer device mounted within the device mounting structure an amount sufficient to reduce the vibration to a level below a second threshold.

In another embodiment, a system for reducing vibrations in a device is provided, said system comprising circuitry for generating a signal corresponding to the vibration level of said device, comparator circuitry for comparing generated ones of said vibration level signals against known vibration level signals of said device, and means for providing a control signal when a compared vibration level signal is outside an accepted range.

A further embodiment provides a system for reducing vibrations in a device, said system comprising means for generating a signal corresponding to the vibration level of said device, means for comparing generated ones of said vibration level signals against known vibration level signals of said device, and means for providing a control signal when a compared vibration level signal is outside an accepted range.

Another embodiment provides a method for determining which of a plurality of devices to use at any given time, said method comprising determining from a vibration level of a given device if such device is suitable for using at said given time.

BRIEF DESCRIPTION OF THE DRAWINGS

FIG. 4 is a flow chart showing one embodiment according to the teachings of the invention.

DETAILED DESCRIPTION

Figure 1:
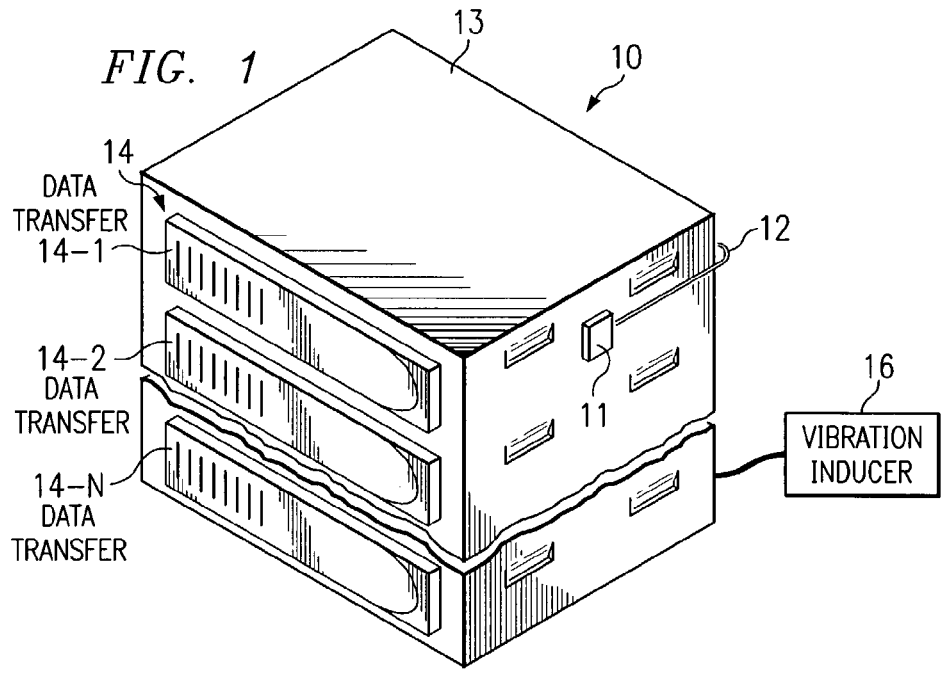
FIG. 1 shows one embodiment of a system using the teachings of the inventive concept.

Turning now to FIG. 1, there is shown one embodiment of the teachings of the inventive concept showing system 10 in which drive cage 13 has mounted within it a plurality of data transfer devices 14-1 through 14-N, such as may comprise disk drives comprising a RAID array. RAID circuit 15 (shown in schematic form in FIG. 2) may also be included within system 10. Also associated with drive cage 13 is accelerometer 11 connected to cage 13. Accelerometer could, for example be a tri-axial accelerometer, and could be on the outside of drive cage 13, or mounted within drive cage 13, the purpose being to create a signal (for example, an amplitude and frequency signal) showing the vibration amplitude of drive cage 13 for various vibration frequencies. Typically, the frequency of vibration would be between 0 and 700 Hz. The precise frequency and frequency range would depend upon the product or devices being protected. Accelerometer 11 of one embodiment is designed to provide a broadband spectrum response over a range of frequencies.

In operation according to one embodiment, accelerometer 11 continuously monitors the frequency and amplitude of the vibration produced by drive cage 13 (or, if desired, by a particular device with cage 13) and provides that input for monitoring and comparison against a known standard for the particular device(s) of concern. Monitor signal of accelerometer 11 would typically describe a curve within a set of boundaries. When the frequency and/or amplitude of vibrations monitored by accelerometer 11 exceeds a given curve (for example, exceeds 2 gs at 4,000 Hz) a control signal may be generated, whether internally by accelerometer 11 or by a system coupled thereto. In one embodiment, this control signal is communicated via cable 12 to RAID circuit 15. Circuit 15, in turn, operates to reduce (or turn off) the data transfer rate of one or more of devices 14-1 through 14-N. According to one embodiment, this operation reduces the vibrations associated with operation of the devices in the cage and also protects the data transfer from jiggling and therefore data loss.

In the example discussed, slowing down the data transfer rate of a data transfer device reduces the vibration it causes. Also, by slowing down the data transfer rate of all of the data transfer devices in cage 13, these devices are less prone to error caused by vibration. Such vibration could be because of a building vibration or could be because equipment in close proximity to drive cage 13 is setting up a vibration in drive cage 13.

It should be appreciated that, in operation, system 10 could reduce one data transfer unit, or all the data transfer units. Moreover, such reduction need not be equally applied within cage 13.

Device 16 is used, if desired, to induce known vibration to cage 13 for calibration purposes. For example, device 16 may be utilized to empirically determine vibration frequencies and/or amplitudes at which degraded performance of data transfer devices 14-1 through 14-N is experienced for setting control threshold values according to embodiments of the invention. Additionally or alternatively, device 16 may be utilized in determining data transfer rate adjustments suitable for addressing particular vibration frequencies and/or amplitudes.

Figure 2:
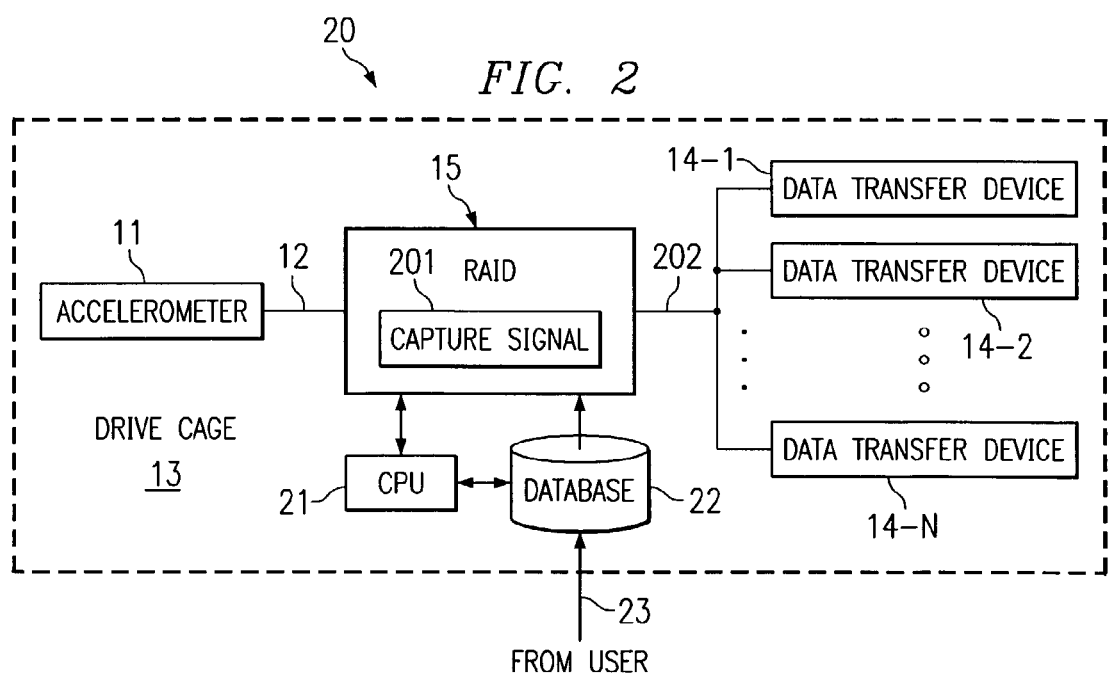
FIG. 2 is a block schematic diagram of one embodiment of the operation of the teachings of the inventive concept.

FIG. 2 shows a block schematic diagram of one embodiment of the operation of the teachings of the inventive concept. As shown in FIG. 2, accelerometer 11 within system 20 provides a signal, which in the embodiment discussed is an amplitude (and/or frequency) curve. This signal is provided via cable 12 to circuit 15, which has associated therewith CPU 21 and data base 22. Circuit 15 could be a RAID circuit if desired and could be located within cage 13 or remote therefrom. Cable 12 could be replaced with a wireless transmitter if desired. Circuit 15 matches the currently provided signal from accelerometer 11 against one or more signal curves, as stored in data base 22, to determine if the vibration level of drive cage 13 exceeds a desired amount. If it does not, then data transfer devices 14-1 through 14-N are allowed to operate at their normal speed or at their present settings. If, however, the current vibration exceeds the desired vibration level then the circuit operates to reduce the data transfer rate of at least one of data transfer devices 14-1 through 14-N. As discussed, this reduction could be by turning one or more devices off, by reducing the data transfer rate of one or more devices via signals sent over path 202, or combination thereof.

Figure 3:
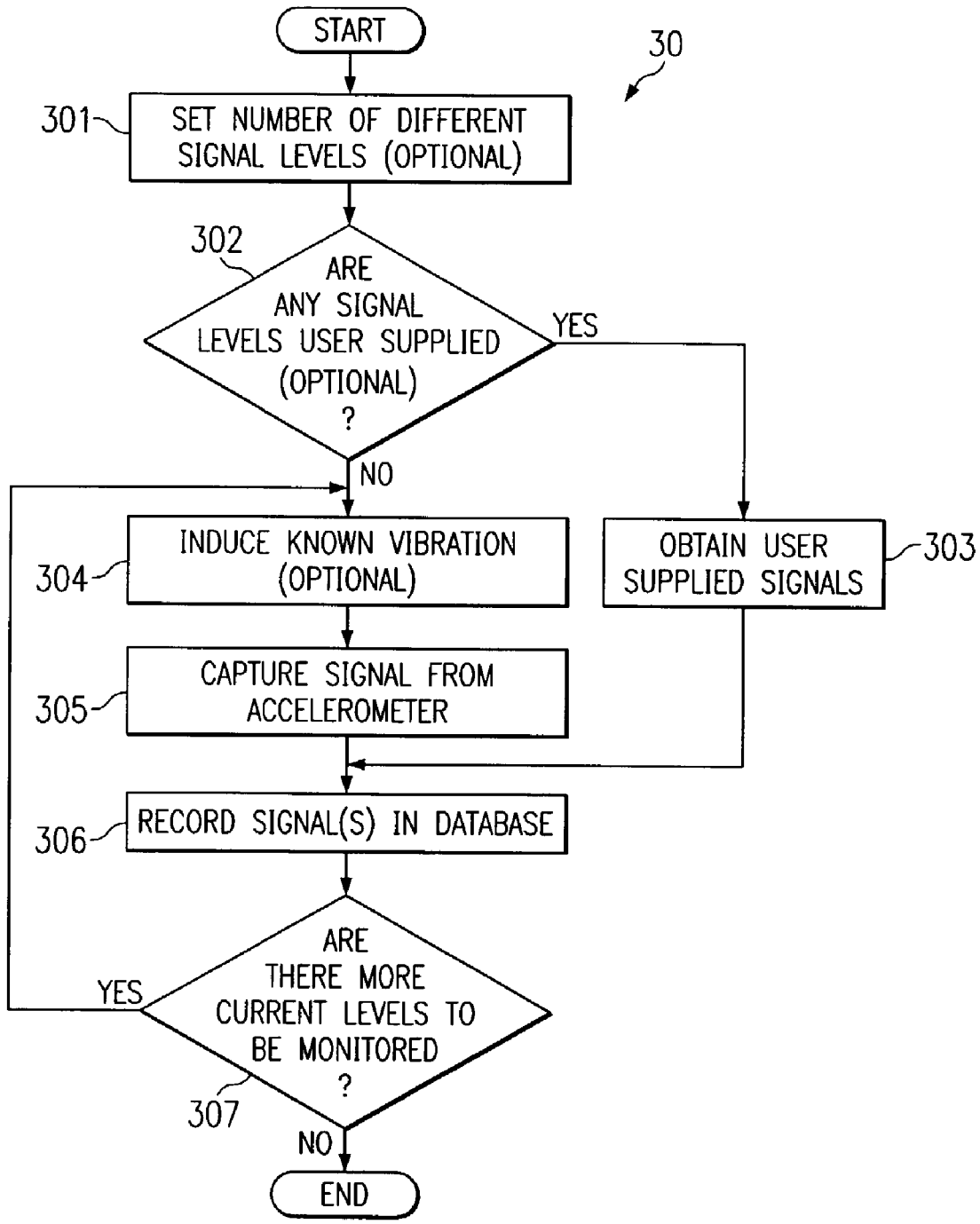
FIG. 3 is a flow chart showing one illustrative embodiment of the generation of a desired vibration level.

Turning now to FIG. 3, there is shown a flow chart of one embodiment of the generation of a desired vibration level for establishing standard reference signal levels for vibration which will then be utilized to compare against subsequent vibration signals to determined if action needs be taken. Process 301, if desired, may be used to set the number of different signal levels desired. These levels could be established so that a user from time to time could select different acceptable vibration levels for a particular device.

Process 302 determines whether any signal levels are user supplied. This again is optional. If the user supplies a known signal, process 303 controls how this signal is to be obtained from the user. If there are no user supplied levels, then the system optionally, under process 304, induces known vibration (for example, via device 16 FIG. 1) into drive cage 13. In process 305 the signal is captured from accelerometer 11 via circuit, 15, FIG. 2. The captured signal is then stored in data base 22, for example under control of CPU 21 as shown by process 306. After this recording is complete the system then checks, via process 307, to see if there are more levels to be established. If there are, then processes 304, 305, and 306 are repeated until all of the desired levels have been set. At that point the process ends.

Turning now to FIG. 4, there is shown a flow chart of one embodiment 40 of the teachings of the invention. Process 401 compares a recent accelerometer signal obtained from accelerometer 111 against a standard. This standard could be the only signal in data base 22 (FIG. 1) pertaining to the system being tested or could be a standard that is selected from among several, via process 402. Some of the signals could be provided, if desired, live from the user and not stored previously if desired.

Process 403 determines if the signal is too high, e.g., the amplitude at a certain frequency is outside of a given range. This can be accomplished by well-known signal level comparitor devices, such as one of the many integrated circuit comparitors available today, or as may be implemented in software.

In process 404, if the vibration signal that is currently being received is out of range then a control signal is sent and this signal is received by process 405 and is used to adjust the data transfer rate of one or more of data transfer devices 14-1 to 14-N (as discussed above). The system then compares the new vibration signal (after adjustment), via process 406, and if the signal is still too high, via process 407, then an additional speed reduction is initiated via process 404 and 405. Again, if desired, the accelerometer signal is compared to see if the vibration signal is within the acceptable range. If it is, then the whole process repeats via process 401.

The system can be set to monitor vibration even when no data is being transferred, or data transfer is off. Such an embodiment might be desired because, if extrinsic vibration is too high, other data transfer devices in other locations might be used to reduce errors. This, for example, could be controlled via process 408, which signals that this device is available when the signal level (vibration) is not too high. Process 409 signals to select another device when vibration of this device is higher than desired.

It should be noted that while the illustrative embodiment has focused on data transfer devices, such as disk drives or printers, other devices, e.g., any devices which are the source of vibration and/or is susceptible to the effects of vibration such as fans, scanners, and the like, may be subject to the same control. Also the device which suffers from excess vibration may not be the device which causes such vibration. Thus, it may be desirable to reduce a parameter of a device other than a data transfer device to achieve the desired results.

What is claimed is:

1. A system for reducing vibrations in a device, wherein said device includes a data transfer device, said system comprising:
   circuitry for generating a signal corresponding to the vibration level of said device;
   comparator circuitry for comparing generated ones of said vibration level signals against known vibration level signals of said device;
   means for providing a control signal when a compared vibration level signal is outside an accepted range; and
   a controller for reducing the data transfer rate of said data transfer device under at least partial control of said control signal.

2. The system of claim 1 wherein said vibration level signal comprises frequency and amplitude components.

3. A system for reducing vibrations in a device, said system comprising:
   means for generating a signal corresponding to the vibration level of said device, wherein said device is a disk drive data transfer device;
   means for comparing generated ones of said vibration level signals against known vibration level signals of said device;
   means for providing a control signal when a compared vibration level signal is outside an accepted range; and
   means for reducing the data transfer rate of said disk drive data transfer device under at least partial control of provided ones of said signals.

4. The system of claim 3 wherein said vibration level signal comprises frequency and amplitude components.

5. A method for reducing vibrations in a device, wherein said device includes a data transfer device, said method comprising:
   generating a signal corresponding to the vibration level of said device;
   comparing generated ones of said vibration level signals against a known vibration level signal of said device;
   providing a control signal when a compared vibration level signal is outside an accepted range; and
   reducing the data transfer rate of said data transfer device under at least partial control of provided ones of said signals.

6. The method of claim 5 wherein said device is a data transfer device.

7. The method of claim 5 wherein said vibration level signal comprises frequency and amplitude components.

8. The method of claim 7 wherein said known vibration level signal is pre-generated and recorded using said device.

9. The method of claim 7 wherein said known vibration level signal is pre-generated and recorded using a standard device.

10. The method of claim 5 further comprises:
    determining if a frequency of monitored vibrations exceeds a predetermined frequency by said comparing generated ones of said vibration level signals against known vibration level signals of said device.

11. The method of claim 5 wherein said known vibration level signal is pre-generated introducing a known vibration and monitoring a captured signal corresponding to the vibration level.

12. A method of reducing vibration in a device mounting structure, said method comprising:

determining when the vibration level of said device mounting structure exceeds a first threshold, wherein a plurality of data transfer devices are concurrently mounted to said device mounting structure;

reducing the data transfer rate of at least one data transfer device mounted to said device mounting structure an amount sufficient to reduce the vibration to a level below a second threshold; and reducing the data transfer rate unequally with respect to said plurality of data transfer devices.

* * * * *

UNITED STATES PATENT AND TRADEMARK OFFICE
CERTIFICATE OF CORRECTION

PATENT NO.        : 7,299,141 B2
APPLICATION NO.   : 10/310633
DATED             : November 20, 2007
INVENTOR(S)       : Raymond Chin Page 1 of 1

It is certified that error appears in the above-identified patent and that said Letters Patent is hereby corrected as shown below:

Column 3, line 35, delete "111" and insert -- 11 --, therefor.

Signed and Sealed this

Twentieth Day of May, 2008

JON W. DUDAS
*Director of the United States Patent and Trademark Office*